United States Patent [19]

Berg

[11] 4,026,162
[45] May 31, 1977

[54] TOOTHED TRANSMISSION BELT

[76] Inventor: Winfred M. Berg, 89 Grant Ave., East Rockaway, N.Y. 11518

[22] Filed: July 23, 1975

[21] Appl. No.: 598,410

[52] U.S. Cl. .............................. 74/231 C; 74/231 J
[51] Int. Cl.² .......................................... F16G 1/28
[58] Field of Search .......... 74/231 C, 231 J, 231 R, 74/240, 237; 156/137, 138

[56] References Cited

UNITED STATES PATENTS 2,566,262  8/1951  Traxler ................................. 74/237
2,770,977  11/1956  Beckadolph et al. ............. 74/231 C Primary Examiner—Leonard H. Gerin
Attorney, Agent, or Firm—Edward Halle

[57] ABSTRACT

A toothed transmission belt adaptable for use with gears and sprockets featuring an elongated body portion comprising at least one elongated flexible body element cable with a flexible belt-like covering and a series of teeth indented into the belt-like covering.

11 Claims, 9 Drawing Figures

U.S. Patent May 31, 1977 Sheet 1 of 2 4,026,162
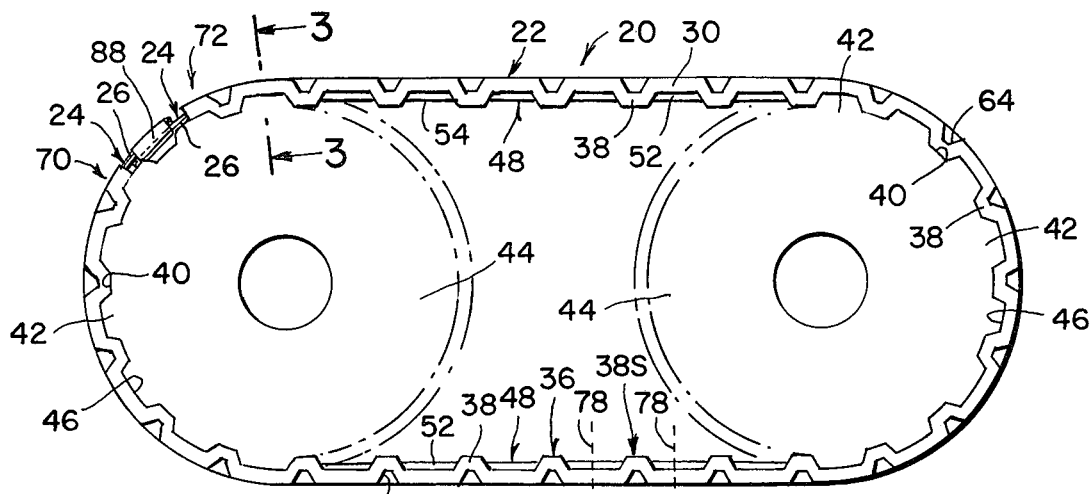
Fig. 1
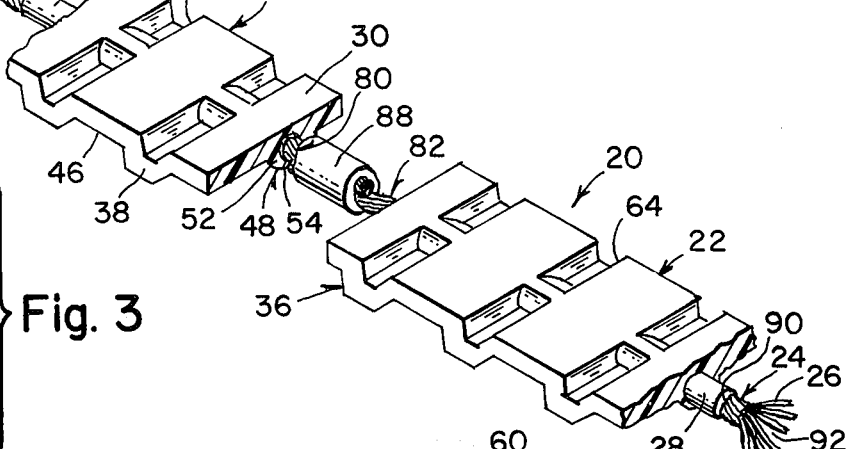
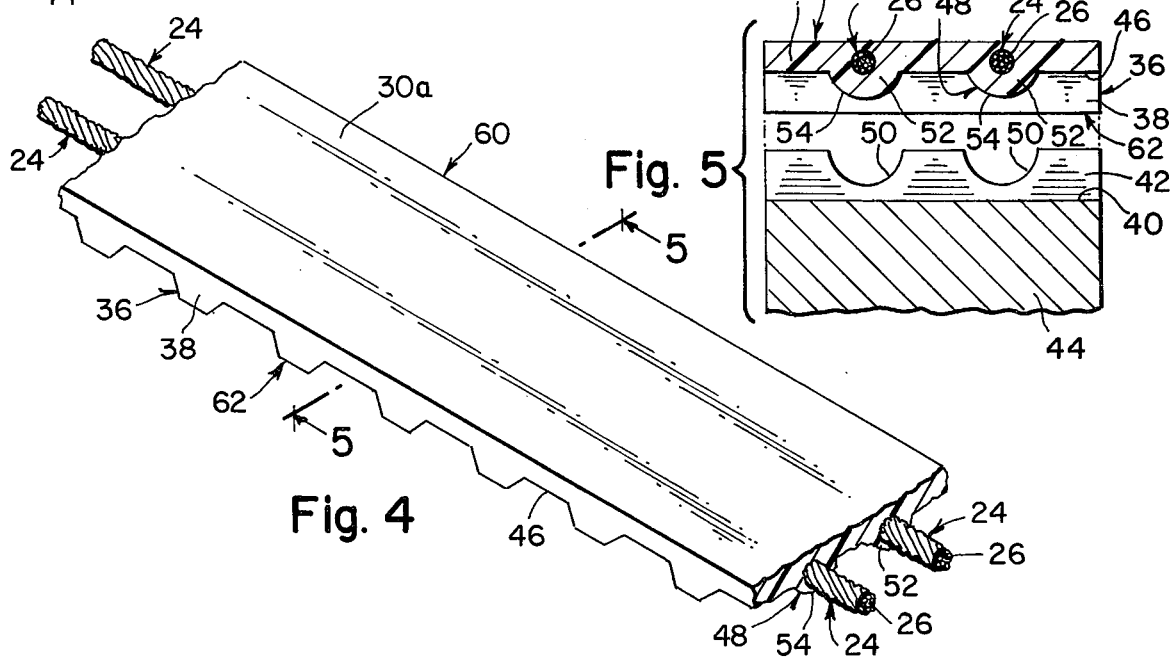

TOOTHED TRANSMISSION BELT

SUMMARY OF THE INVENTION

This invention relates to toothed transmission drive belts such as timing gear belts, or the like, to provide for positive, non-slip drive. Toothed belts having teeth are already known. The usual type of timing belt known to the art requires pulleys having side flanges to prevent the belt from "walking off" the pulleys.

It is a primary object of the invention to provide a timing belt with novel tooth construction which has great flexibility and strength as well as positive drive. It is a further object to provide such a belt which can be used without pulley side flanges.

Further objects and advantages will appear in the specification hereinbelow.

DETAILED DESCRIPTION OF THE INVENTION

The invention is illustrated in the accompanying drawings in which:

FIG. 1 is an elevational view;

FIG. 2 is an enlarged perspective view of the belt of FIG. 1 with parts cut away;

FIG. 3 is an enlarged sectional detail along the lines 3—3 in FIG. 1;

FIG. 4 is a view similar to FIG. 2 illustrating a second form of transmission belt of the invention:

FIG. 5 is a sectional view along the lines 5—5 in FIG. 4;

Similar numerals refer to similar parts throughout the several views.

Figure 6:
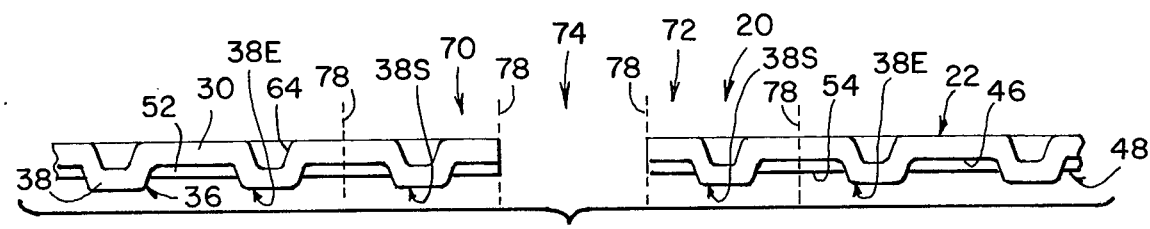
FIG. 6 is an elevational view of the belt of FIG. 1 in looped end facing relationship prior to being spliced into an endless loop with parts cut away.
Figure 7:
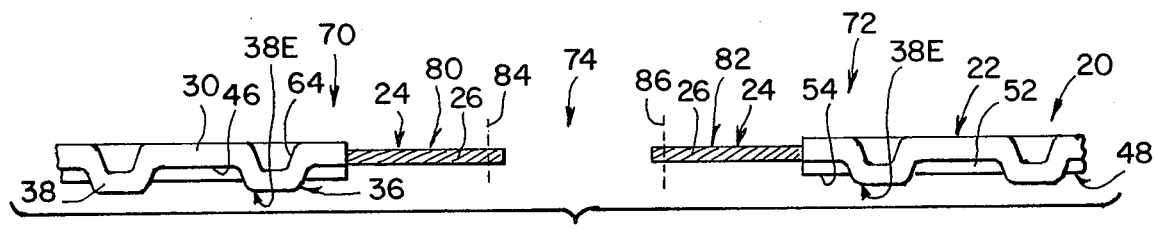
FIG. 7 is an elevational view similar to FIG. 6 showing a step in the splicing of the belt.

The drive transmission means of the invention 20 comprises a main body portion formed by at least one elongated flexible body element 22 which in turn comprises a central cable 24 made up of multiple strands 26 of twisted steel, wire or other suitable material, and covering means such as a plastic cable jacket 28, preferably of soft flexible grade polyurethane, or nylon, which is extruded or molded around the cable 24 by any of the well known means known to the art.

Belt means 30 may be extruded or molded over the covering means 28 by any means known to the art, or the cable cover 28 and the belt may be fashioned integrally as a combination cable cover and belt 30a, as shown in FIGS. 4 and 5.

Belt covering means 30 and 30a are provided with indented portions 36 which form teeth 38. This provides for a firm yet flexible construction having strength and having teeth 38 which are adapted to mesh within the cavity 40 of the teeth 42 of toothed transmission wheel means such as pulleys 44 to drive the pulleys 44 whose teeth 42 also fit within the cavities 46 formed between the teeth 38 of the belt means 30 or 30a.

The construction of the belt means 30 or 30a also provides for belt guide means 48 adapted to fit groove means 50 in the pulley teeth 42. Guide means 48 are made up of a series of arc-like belt guide portions 52 positioned in the cavities 46 between the belt teeth 38. Portions 52 have an arc-like configuration having a curved surface portion 54 concentric to the portion of cable 24 which it covers. Thus the construction comprising the integral belt and cover 30a or the belt 30 and jacket 28 over the cable 24 with the teeth 38 and the belt guide portions 52 provide a transmission belt means 20 having a positive drive for a toothed pulley 44 and also having belt guide means 48 to prevent the belt from "walking off" the pulley 44.

This construction eliminates the necessity of expensive side flanges for the pulley 44 to hold the belt 20 in place, which also would require maintenance, and provides a strong, lightweight, and extremely flexible belt 20 which nevertheless has positive drive.

The belt may have a smooth side 60 opposite the toothed side 62 of belt means 30a, as shown in FIG. 4, or, if desired, recessed portions 64, opposite the indented teeth 38, may be provided as in belt means 30 shown in FIG. 2.

It is to be understood that all belts of the invention may be made with one or more cables in side by side relationship, as shown in either FIG. 2 or 4, and either with integral belts 30a or with two or more layers of material as in belt 30, and with or without recessed portions 64.

Where there is a belt having two or more cables 24, belt guide means 48 and grooves 50 may be provided with relation to each cable 24 (see FIG. 5).

The transmission belt 20 is made in selected lengths as desired for splicing into endless belts 20 of desired sizes. The splice is made as illustrated in FIGS. 6 through 9 of the drawings. In FIG. 6 a single length of a transmission belt 20 is shown which has been coiled around to form an endless loop with its ends 70 and 72 in end facing relationship. In FIGS. 6 through 9 only the ends 70 and 72 of belt 20 are shown since the balance of the belt 20 has been cut away in these figures.

In order to splice the belt 20 so that the teeth 38 will fit within the cavities 40 of the pulleys 44, provision must be made to space the two teeth 38E adjoining the splice area 74 to be positioned properly with the splice 76 taking up the space required by one toothed belt section 38S. This is accomplished by providing a length of belt 20 having end portions 70 and 72 which include belt tooth sections 38S which are overlapped to form the splice 76 of the same length as a single belt tooth section 38S.

A belt tooth section 38S is defined as that section or unit of belt 20 starting at the center line 78 of a cavity 46 and ending at the center line 78 of the next cavity 46 and including the tooth 38 positioned between said cavity 46 and centers 78.

Let it be assumed that belt 20 would require 28 belt tooth sections 38S to drive between two pulleys 44 as in FIG. 1. Since the splice 76 must take the place of one belt tooth section 38S and since it is necessary for ends 70 and 72 to overlap in making the splice 76, the length of belt 20 necessarily would contain the splice 76 plus 27 belt tooth sections 38S. The splice space 76 is equal to two belt tooth sections 38S which are overlapped into the splice 76. Thus a length of belt for a system requiring 28 tooth sections 38A would actually need 29 tooth sections 38A, or one extra to make the splice 76.

The first step in splicing is to provide a proper size belt length, as described. The second step in splicing is to cut all of the jacket 28 and cover material 30, or the belt material 30a, from the cable 24 to lay bare cable ends at 80 and 82 for the length of the end of tooth sections 38S, as in FIG. 7. The next step is to trim ends 80 and 82 a small amount (between approximately 5 to 15 percent of the end 80 and 82 lengths) as shown by the dotted lines at 84 and 86 in FIG. 7.

Figure 8:
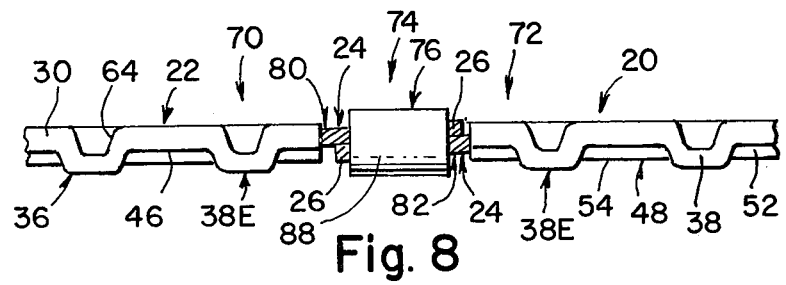
FIG. 8 is an elevational view showing a further step in splicing which includes the positioning of a bushing.
Figure 9:
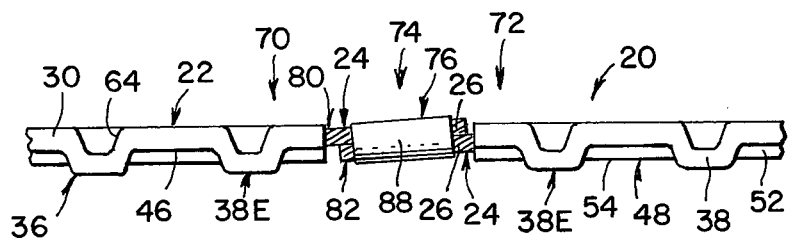
FIG. 9 is an elevational view showing the splice completed with the bushing installed.

The next step is to overlap the cut cable ends 80 and 82 between end tooth units 38E to make a splice space 74 of the length of a single belt tooth section 38S, and then a step of placing an open splice bushing 88 over the overlapped cable ends 80 and 82, as shown in FIG. 8. The final step of the splice is to crimp the open bushing 88 with a crimping tool or by other means to force bind the cable ends 80 and 72 together in positive arrangement by closing the bushing 88.

The splice 76 will ride along over the pulleys 44 with the belt 20 and, if properly made with the splice 76 of the same length as a single belt tooth section, will ride over a pulley cavity 40. Thus the completed belt loop will present teeth 38 to the pulley cavities 40 with the exception of the one belt length comprising the splice. Since there will be a plurality of teeth engaging each pulley, skipping one space for the splice will not affect the efficiency or useability of the belts of the invention.

In addition to the advantages already mentioned there is a further advantage in the strengthening of the cable of the invention in that the material of the jacket 28, which is extruded or molded around the cable 24, will be filled into the spaces 90 around the outer strands 26 of the cable 24 and may also be filled into all of the spaces such as 92 within the cable 24 between the strands 26 of the cable 24 which communicate with the outer surface of the cable.

While I have described my invention in its preferred forms there are many forms that it may take and I desire to be protected for all forms coming within scope of the claims herein below.

Wherefore I claim:

1. Drive transmission means comprising an elongated body portion comprising at least one cable, covering means for the cable, and belt means including a plurality of teeth; said covering means including a plurality of guide portions formed around at least one portion of the surface of the cable with at least one such guide portion positioned between at least one pair of adjoining teeth of said plurality of teeth to form an intermittent longitudinal belt guide means; in which the cable covering means and the belt means are integral.

2. The method for splicing a drive transmission means as claimed in claim 1, which includes belt tooth sections: comprising the steps of measuring the required length of the transmission means and providing one more than the required number of belt tooth sections, then peeling material away from the cable for the length of one toothed section at each end of said transmission means, then shortening the exposed cable at each end thereof by cutting, then placing an expanded bushing over the two exposed ends and positioning the exposed ends within the bushing so that the splice will be relatively as long as a belt tooth section of the belt, and then fixing the bushing to grasp the exposed cable ends to form an endless loop.

3. Drive transmission means comprising an elongated body portion comprising at least one cable, covering means for the cable, and belt means including a plurality of teeth; said belt means including belt guide means comprising at least one arc-like portion formed around at least one portion of the cable, in which there are a plurality of arc-like portions in the belt guide means with at least one such portion positioned between at least one pair of adjoining teeth of said plurality of teeth to form an intermittent longitudinal belt guide means, in which the intermittent portions of the arc-like belt guide means portions have surface configurations which are in substantial concentric relation to at least one portion of the surface of the cable, and in which the teeth are formed along one side of the belt means and the other side of the belt means is provided with at least one recessed portion positioned opposite a toothed portion of said belt.

4. Drive transmission means comprising an elongated body portion comprising at least one cable, covering means for the cable, and belt means including a plurality of teeth; said covering means including a plurality of guide portions formed around at least one portion of the surface of the cable with at least one such guide portion positioned between at least one pair of adjoining teeth of said plurality of teeth to form an intermittent longitudinal belt guide means; in which the cable covering means and the belt means are respectively in the form of a jacket covering said cable and a belt around at least a portion of said jacket.

5. The drive transmission means as claimed in claim 4, in which the cable is a flexible twisted strand cable and in which the cable covering means fills at least the spaces around the outer strands of the cable.

6. The drive transmission means as claimed in claim 5, in which the cable covering means fill substantially all spaces within the cable which communicate with the outer surface of the cable.

7. The drive transmission means as claimed in claim 4, in which the teeth are formed along one side of the belt means and the other side of the belt means is provided with at least one recessed portion positioned opposite a toothed portion of said belt.

8. Drive transmission means as claimed in claim 7 having a plurality of cables in side by side relationship.

9. The drive transmission means as claimed in claim 7 in the form of an endless loop comprising at least one splice which comprises cable ends and a crimped bushing.

10. The endless loop transmission means as claimed in claim 9, in which the spliced portion comprising the crimped bushing has the same relative length of a single belt tooth section of the looped belt.

11. The method for splicing a drive transmission means as claimed in claim 4, which includes belt tooth sections: comprising the steps of measuring the required length of the transmission means and providing one more than the required number of belt tooth sections, then peeling material away from the cable for the length of one toothed section at each end of said transmission means, then shortening the exposed cable at each end thereof by cutting, then placing an expanded bushing over the two exposed ends and positioning the exposed ends within the bushing so that the splice will be relatively as long as a belt tooth section of the belt, and then fixing the bushing to grasp the exposed cable ends to form an endless loop.

* * * * *